United States Patent
Nakatsugawa et al.

(10) Patent No.: US 8,553,717 B2
(45) Date of Patent: Oct. 8, 2013

(54) INFORMATION PROCESSING DEVICE, COMMUNICATION METHOD, AND PROGRAM PRODUCT

(75) Inventors: Yasumasa Nakatsugawa, Tokyo (JP); Atsuo Yoneda, Kanagawa (JP); Toyokazu Ota, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 259 days.

(21) Appl. No.: 12/338,398

(22) Filed: Dec. 18, 2008

(65) Prior Publication Data

US 2009/0168807 A1 Jul. 2, 2009

(30) Foreign Application Priority Data

Dec. 27, 2007 (JP) ................................ 2007-337334

(51) Int. Cl.
*H04J 3/16* (2006.01)

(52) U.S. Cl.
USPC .................. 370/466; 703/27; 710/10; 710/11

(58) Field of Classification Search
USPC ................. 370/350, 503, 328, 513, 498, 466; 703/27; 710/10, 11
See application file for complete search history.

(56) References Cited

U.S. PATENT DOCUMENTS

| | | | | |
|---|---|---|---|---|
| 5,799,171 A | * | 8/1998 | Kondou | 703/27 |
| 6,708,182 B1 | * | 3/2004 | Kobayashi | 1/1 |
| 7,711,323 B2 | * | 5/2010 | Fujii | 455/41.1 |
| 7,742,604 B2 | * | 6/2010 | Yamagata et al. | 380/270 |

FOREIGN PATENT DOCUMENTS

JP 2007-34994 2/2007

OTHER PUBLICATIONS

Tokukaisho 60-254941 plublish 1985.*

* cited by examiner

*Primary Examiner* — Dady Chery

(74) *Attorney, Agent, or Firm* — Oblon, Spivak, McClelland, Maier & Neustadt, L.L.P.

(57) ABSTRACT

An information processing device includes a transmission portion that transmits repeatedly, at a specified time interval, one combination packet that is created such that it includes, within a packet that is compatible with one format, a packet that is compatible with another format. It is therefore possible for the information processing device to perform non-contact communication in a plurality of formats without repeatedly transmitting in succession a plurality of copies of the same packet, each copy being compatible with a different format.

10 Claims, 10 Drawing Sheets

INFORMATION PROCESSING DEVICE, COMMUNICATION METHOD, AND PROGRAM PRODUCT

CROSS REFERENCES TO RELATED APPLICATIONS

The present invention contains subjected matter related to Japanese Patent Application JP 2007-337334 filed in the Japan Patent Office on Dec. 27, 2007, the entire contents of which being incorporated herein by reference.

BACKGROUND OF THE INVENTION

1. Field of the Invention

The present application relates to an information processing device, a communication method, and a program product.

2. Description of the Related Art

In recent years, mobile phones and the like (hereinafter called "devices") that are provided with either non-contact IC cards or non-contact IC card functions have become widespread. The devices are used, for example, for public transportation ticket services, for bill payment services at retail stores, and the like. The non-contact IC card functions can be provided not only in mobile phones, but also in mobile information terminals such as smart phones, personal digital assistants (PDAs), and the like, as well as in information processing devices such as personal computers and the like.

The functions may be implemented through non-contact communication with a reader/writer that is capable of at least one of writing information to a memory chip in any one of the devices described above and reading information that is stored in the memory chip. For example, by holding one of the devices described above up to a reader/writer that is compatible with a desired service, a user can receive the desired service. A state of non-contact communication is established when the device receives a polling command that is transmitted from the reader/writer and transmits a polling command response packet back to the reader/writer.

However, as recognized by the present inventors, if the polling command specifications are changed to a new version, a device that is compatible with only an old version of the specifications will not be able to establish the state of non-contact communication. Therefore, a technology is required that transmits a polling command that is compatible with both the new and old versions.

SUMMARY OF THE INVENTION

However, as recognized by the present inventors, because the reader/writer transmits a plurality of types of polling commands in succession, the interval between the transmissions of a polling command of a specified format is long. Furthermore, in a case where the device that is held up to the reader/writer is capable of responding to a plurality of types of polling commands, the device consumes an excessive amount of time in confirming which of the formats in which it is capable of responding is a suitable format. This delays the establishment of a non-contact communication path.

The present invention addresses these issues and provides an information processing device, a communication method, and a program that are new and improved and that make it possible to establish non-contact communication comparatively quickly with an information processing device that is compatible with a plurality of formats and compatible with a specified format.

In order to address the issues described above, according to an embodiment of the present invention, there is provided an information processing device that is capable of performing non-contact communication in a plurality of formats. The information processing device includes a transmission portion that transmits repeatedly, at a specified time interval, one combination packet that is created such that it includes, within a packet that is compatible with one of the formats, a packet that is compatible with another of the formats.

The transmission portion may also transmit data that is in the one combination packet and is in the one of the formats and data that is in the one combination packet and is in the other of the formats at different communication speeds.

The transmission portion may also transmit an error detection code part that is contained in the data that is in the one combination packet and is in the one of the formats at the same communication speed as the data that is in the one combination packet and is in the other of the formats.

The transmission portion may also transmit repeatedly, at a specified time interval, one combination packet that is created such that it includes, within a packet that expresses a specified command in one form, a packet that expresses the specified command in another form.

The transmission portion may also transmit repeatedly, at a specified time interval, one combination packet that is created such that it includes, within a packet that is compatible with one of the formats, a packet that is compatible with another of the formats.

The information processing device may also be a mobile type of telephone device that has a calling function.

In order to address the issues described above, according to another embodiment of the present invention, there is provided a communication method for a first information processing device and a second information processing device that are capable of non-contact communication with one another in a plurality of formats. The communication method includes a step of transmitting repeatedly from the first information processing device, at a specified time interval, one combination packet that is created such that it includes, within a packet that is compatible with one of the formats, a packet that is compatible with another of the formats. The communication method also includes a step of receiving, by the second information processing device, of the repeatedly transmitted one combination packet, after the second information processing device has entered an area where the non-contact communication is possible. The communication method also includes a step of transmitting, by the second information processing device, of a response packet from the second information processing device to the first information processing device in response to a command that is indicated by the packet, within the received one combination packet, that is in the format that is compatible with the second information processing device.

The transmitted one combination packet may also contain information on a slot range within which the response packet that will be transmitted by the second information processing device can be allocated.

In order to address the issues described above, according to another embodiment of the present invention, there is provided a program that causes a computer to perform a function that sets a packet structure of a packet that will be transmitted repeatedly at a specified time interval when non-contact communication is performed in a plurality of formats. The program also causes the computer to perform a function that sets a structure of one combination packet that includes, within a packet that is compatible with one of the formats, a packet that is compatible with another of the formats.

In a case where the information processing device that receives the combination packet is capable of responding to a packet in the one of the formats and to a packet in the other of the formats, as well as in a case where the information processing device that receives the combination packet is capable of responding to one of a packet in the one of the formats and a packet in the other of the formats, using the combination packet structure described above makes it possible for the information processing device to respond. That eliminates the need for the information processing device to transmit a plurality of types of packets in succession that are each compatible with a different format. It also makes it possible to establish a non-contact communication path comparatively quickly using the combination packet.

Furthermore, varying the communication speed for each packet makes it possible to set a high communication speed for each format and also makes it possible to transmit the combination packet at higher speed. In addition, defining a dedicated range of slots for each format makes it possible to avoid competition for response slots between different formats.

According to the embodiments of the present invention described above, it is possible to establish, at a comparatively high speed, a non-contact communication path between information processing devices that are each compatible with a plurality of formats and compatible with a specified format.

DETAILED DESCRIPTION OF THE PREFERRED EMBODIMENTS

Figure 1:
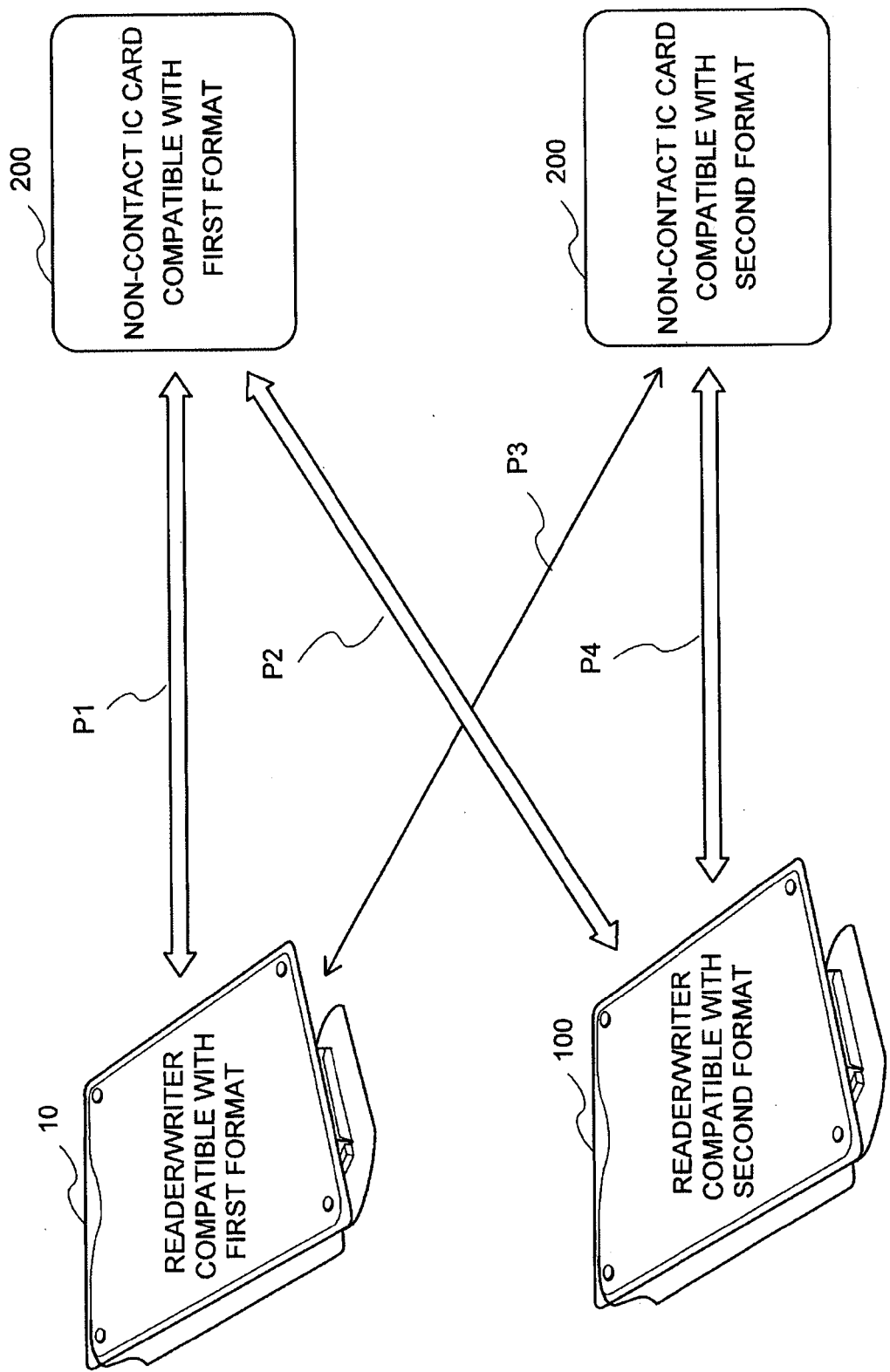
FIG. 1 is an explanatory figure that shows a configuration of a non-contact communication system.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First, an embodiment of the present invention will be explained. One feature of the present embodiment is a polling command packet structure that is compatible with a plurality of formats that are used in a non-contact communication system. A method of using the polling command to establish a state of communication, as well as a specific device configuration and the like for implementing the method, will be explained below.

First, with reference to FIG. 1, a general explanation will be provided of a system configuration of the non-contact communication system that is compatible with a plurality of formats and the method of establishing the state of communication in the non-contact communication system. FIG. 1 is an explanatory figure that shows the system configuration of the non-contact communication system according to the present embodiment.

As shown in FIG. 1, the non-contact communication system to which the present embodiment is applied includes an earlier-generation reader/writer 10 that is compatible with only a first format, a new-generation reader/writer 100 that is compatible with both the first format and a second format, an earlier-generation non-contact IC card 200 that is compatible with only the first format, and a new-generation non-contact IC card 200 that is compatible with the second format. Note that for the sake of convenience in the explanation, it is assumed that the first format is an earlier-generation format and the second format is a new-generation format.

The earlier-generation reader/writer 10 attempts to establish the state of communication using the polling command in the first format. Using the polling command in the first format makes it possible for the earlier-generation reader/writer 10 to establish the state of communication with the earlier-generation non-contact IC card 200 (P1). However, if the new-generation non-contact IC card 200 is held up to the earlier-generation reader/writer 10, the polling command in the first format will be interpreted and the state of communication will be established only in a case where the new-generation non-contact IC card 200 is compatible with the polling command in the first format (P3).

In much the same way, the new-generation reader/writer 100 attempts to establish the state of communication using the polling command that is compatible with both the first format and the second format (hereinafter called the "combination-format polling command"). The combination-format polling command is a specific technology of the present embodiment. The new-generation reader/writer 100 can use this technology to establish the state of communication with the earlier-generation non-contact IC card 200 (P2). Moreover, if the new-generation non-contact IC card 200 is held up to the new-generation reader/writer 100, the combination-format polling command will be interpreted and the state of communication will be established by the new-generation non-contact IC card 200 (P4).

In this manner, the use of the combination-format polling command according to the present embodiment allows the new-generation reader/writer 100 to perform well without differentiating among a plurality of types of polling commands according to the format of the non-contact IC card 200. This makes the processing that is necessary to establish the state of communication more efficient, which in turn makes it possible to establish the state of communication in a shorter time. These effects will be explained in more detail below.

Figure 2:
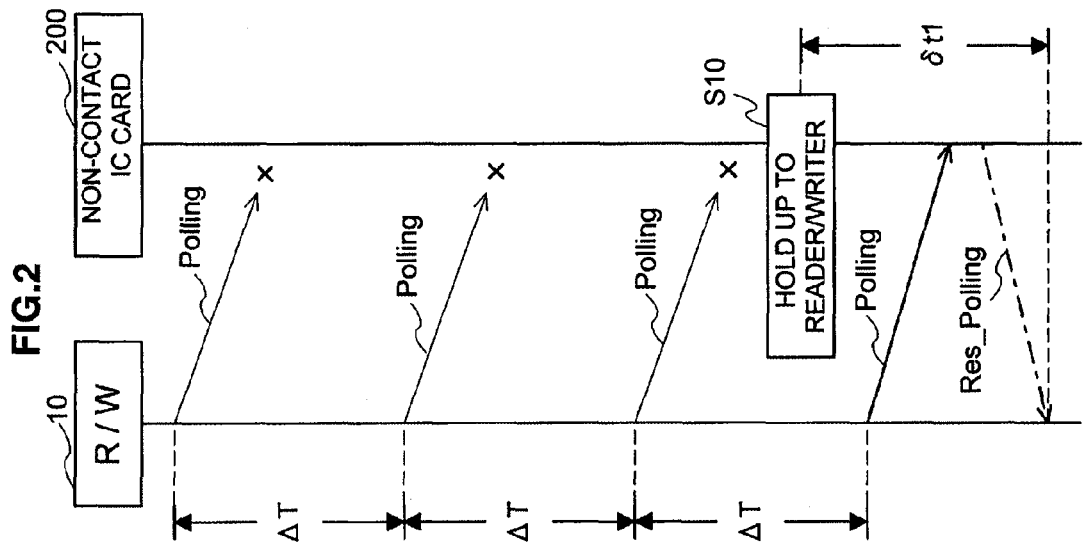
FIG. 2 is an explanatory figure that shows timings of polling command transmissions and a response.

First, a method by which the earlier-generation reader/writer 10 establishes the state of communication will be explained briefly with reference to FIG. 2. FIG. 2 is an explanatory figure that shows a flow of processing to establish the state of communication.

As shown in FIG. 2, the earlier-generation reader/writer 10 transmits the polling command (Polling) at a specified interval of time ☐T until the non-contact IC card 200 is held up to the reader/writer 10. When the non-contact IC card 200 is held up to the reader/writer 10 (S10), the polling command that is transmitted from the earlier-generation reader/writer 10 is received by the non-contact IC card 200. The non-contact IC card 200 then transmits a response command (Res_Polling) to the earlier-generation reader/writer 10 in response to the polling command. The state of communication is established by the receiving of the response command by the earlier-generation reader/writer 10.

As shown in FIG. 2, after the non-contact IC card 200 is held up to the reader/writer 10, a period of time ☐t1 is required until the state of communication is established. Note that although the explanation above uses the earlier-generation reader/writer 10 as an example, the state of communication is established through the same sort of process as that described above for any reader/writer that is not compatible with a plurality of formats, regardless of the type of format. However, a different process that will be explained later is used for a reader/writer that is compatible with a plurality of formats, such as the new-generation reader/writer 100.

Figure 3:
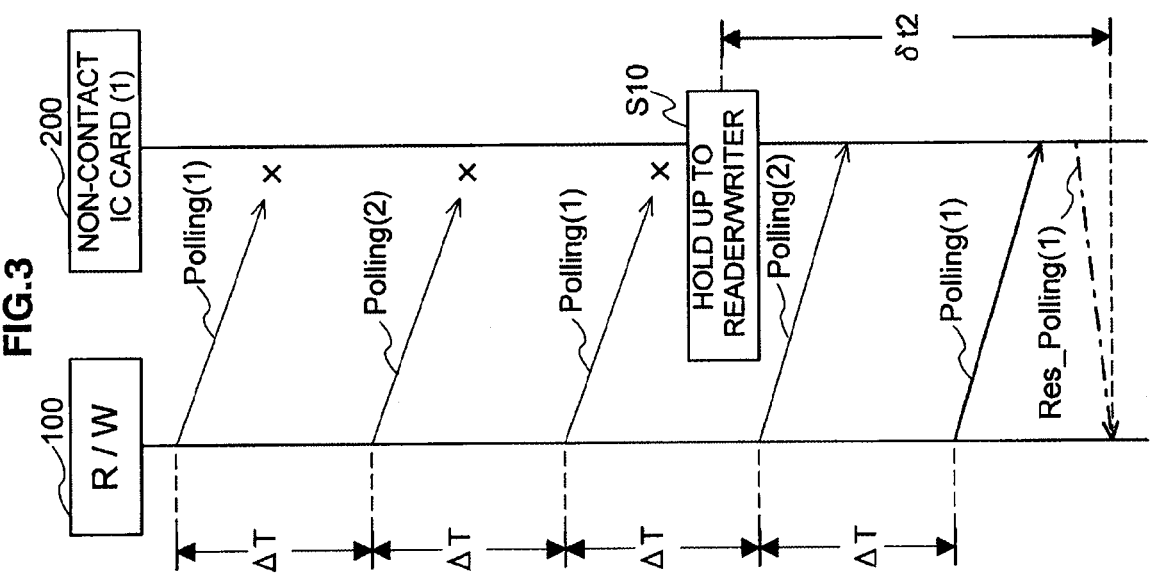
FIG. 3 is an explanatory figure that shows timings of polling command transmissions of a plurality of methods.

Next, a method by which a reader/writer that is compatible with a plurality of formats establishes the state of communication will be explained briefly with reference to FIG. 3. FIG. 3 is an explanatory figure that shows a flow of processing to establish the state of communication. Note that in the explanation of FIG. 3, the new-generation reader/writer 100 is compatible with a plurality of formats, but the new-generation reader/writer 100 does not use the combination-format polling command described above.

As shown in FIG. 3, the new-generation reader/writer 100 alternately transmits a polling command in the first format (Polling (1)) and a polling command in the second format (Polling (2)) at a specified interval of time ☐T until the non-contact IC card 200 is held up to the reader/writer 100. In a case where the non-contact IC card 200 that is compatible with the first format is held up to the reader/writer 100 (S10), the polling command that is transmitted by the new-generation reader/writer 100, regardless of its format, is received by the non-contact IC card 200 that is compatible with the first format. However, the non-contact IC card 200 that is compatible with the first format cannot interpret the polling command in the second format, so it processes the polling command in the second format as noise and does not respond.

Accordingly, the new-generation reader/writer 100 next transmits the polling command in the first format. The non-contact IC card 200 that is compatible with the first format receives and interprets the polling command in the first format, and in response to the polling command, transmits to the new-generation reader/writer 100 a response command in the first format (Res_Polling (1)). The state of communication based on the first format is established by the receiving of the response command in the first format by the new-generation reader/writer 100.

As shown in FIG. 3, after the non-contact IC card 200 that is compatible with the first format is held up to the reader/writer 100, a period of time ☐t2 (that is not less than ☐t1) is required until the state of communication is established. In other words, even though the new-generation reader/writer 100 is compatible with a plurality of formats, in a case where the polling commands in the plurality of formats are transmitted in succession, the time that is required until the state of communication is established becomes longer, because it is dependent on the type of the non-contact IC card 200 that is held up to the reader/writer 100 and on the timing of the holding up of the non-contact IC card 200. The same sort of situation also arises in a case where the new-generation non-contact IC card 200, which is not compatible with the first format, is held up to the reader/writer 100.

Figure 4:
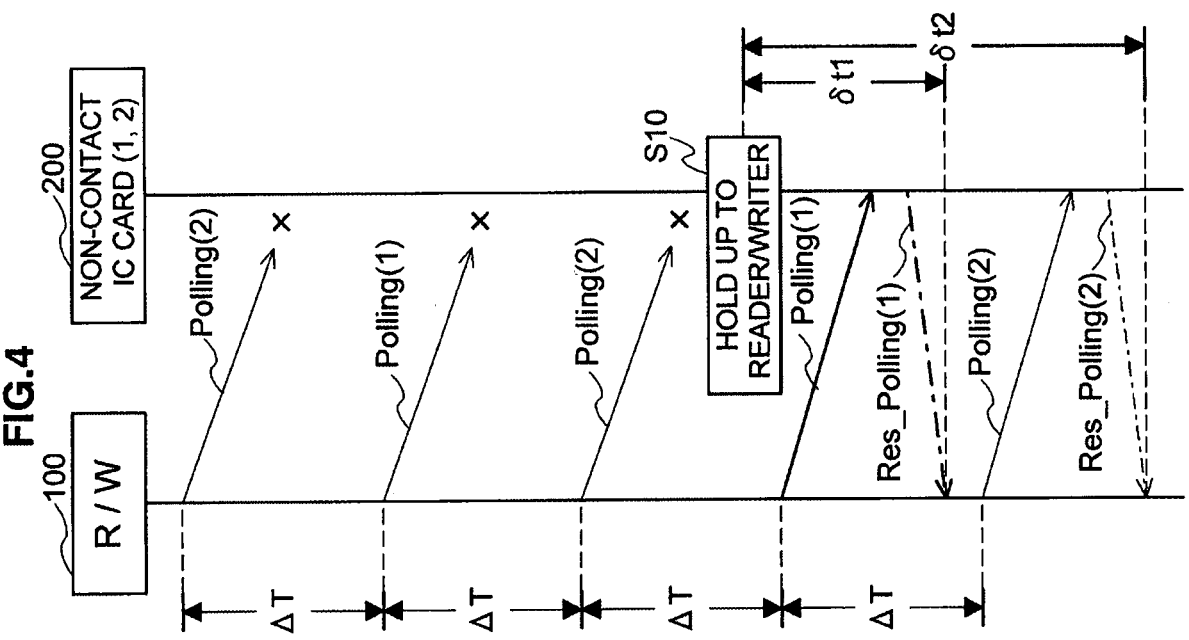
FIG. 4 is an explanatory figure that shows timings of responses to polling command transmissions of a plurality of methods.

Next, a case will be explained, with reference to FIG. 4, in which a new-generation non-contact IC card 200 that is compatible with the first format is held up to the reader/writer 100. FIG. 4 is an explanatory figure that shows a flow of processing to establish the state of communication in the case where the new-generation non-contact IC card 200 that is compatible with the first format is held up to the reader/writer 100.

As shown in FIG. 4, the new-generation reader/writer 100 alternately transmits a polling command in the first format (Polling (1)) and a polling command in the second format (Polling (2)) at a specified interval of time ☐T until the non-contact IC card 200 is held up to the reader/writer 100. In a case where the new-generation non-contact IC card 200 that is compatible with the first format is held up to the reader/writer 100 (S10), the polling command that is transmitted by the new-generation reader/writer 100, regardless of its format, is received by the non-contact IC card 200 that is compatible with the first format.

In a case where the polling command in the first format is transmitted immediately after the new-generation non-contact IC card 200 that is compatible with the first format is held up to the reader/writer 100, the new-generation non-contact IC card 200 that is compatible with the first format can interpret the polling command in the first format, so it transmits a response command in the first format (Res_Polling (1)) in response to the polling command in the first format. Because the non-contact IC card 200 transmits the response command in the first format, the new-generation reader/writer 100 cannot recognize that the non-contact IC card 200 that responded is the new-generation non-contact IC card 200 that is compatible with the second format.

However, the services that the non-contact IC card 200 can utilize in a case where the state of communication is established in the first format may differ from those that can be utilized in a case where the state of communication is established in the second format. It may also be possible to transmit and receive information at higher speed in the state of communication in the second format than in the state of communication in the first format. Particularly in a case where the difference between the first format and the second format distinguishes a new-generation technology from an earlier-generation technology, the second format will be superior to the first format in many respects. Therefore, in a case where the non-contact IC card 200 is compatible with both formats, it is preferable for the new-generation second format to be used.

Accordingly, after receiving the response command in the first format, the new-generation reader/writer 100 also transmits the polling command in the second format (Polling (2)) to the non-contact IC card 200. The new-generation non-contact IC card 200 interprets the polling command in the second format and responds to it by transmitting the response command in the second format to the new-generation reader/writer 100. Receiving the response command in the second format makes it possible for the new-generation reader/writer 100 to establish the state of communication in the second format. Note that in a case where a timeout occurs without the response command in the second format being transmitted, the new-generation reader/writer 100 can determine that the non-contact IC card 200 is of the earlier generation.

Thus, in a case where the possibility is taken into account that a new-generation non-contact IC card 200 that is compatible with the first format will be held up to the reader/writer 100, the time that is required for the new-generation reader/writer 100 to establish the state of communication is made longer by the time that is used to recognize the format of the non-contact IC card 200. In other words, as in the example in FIG. 4, even in a case where the state of communication in the first format can be established in the time □t1, the reader/writer 100 also confirms whether or not the non-contact IC card 200 is compatible with the second format, so additional time (□t2–□t1) is consumed. That means that the overall responsiveness of the processing by the non-contact IC card 200 is diminished.

Accordingly, the inventor of the present invention has devised a technology related to a new-generation reader/writer 100 that utilizes the combination-format polling command according to the present embodiment. The technology will be explained in detail below.

Figure 5:
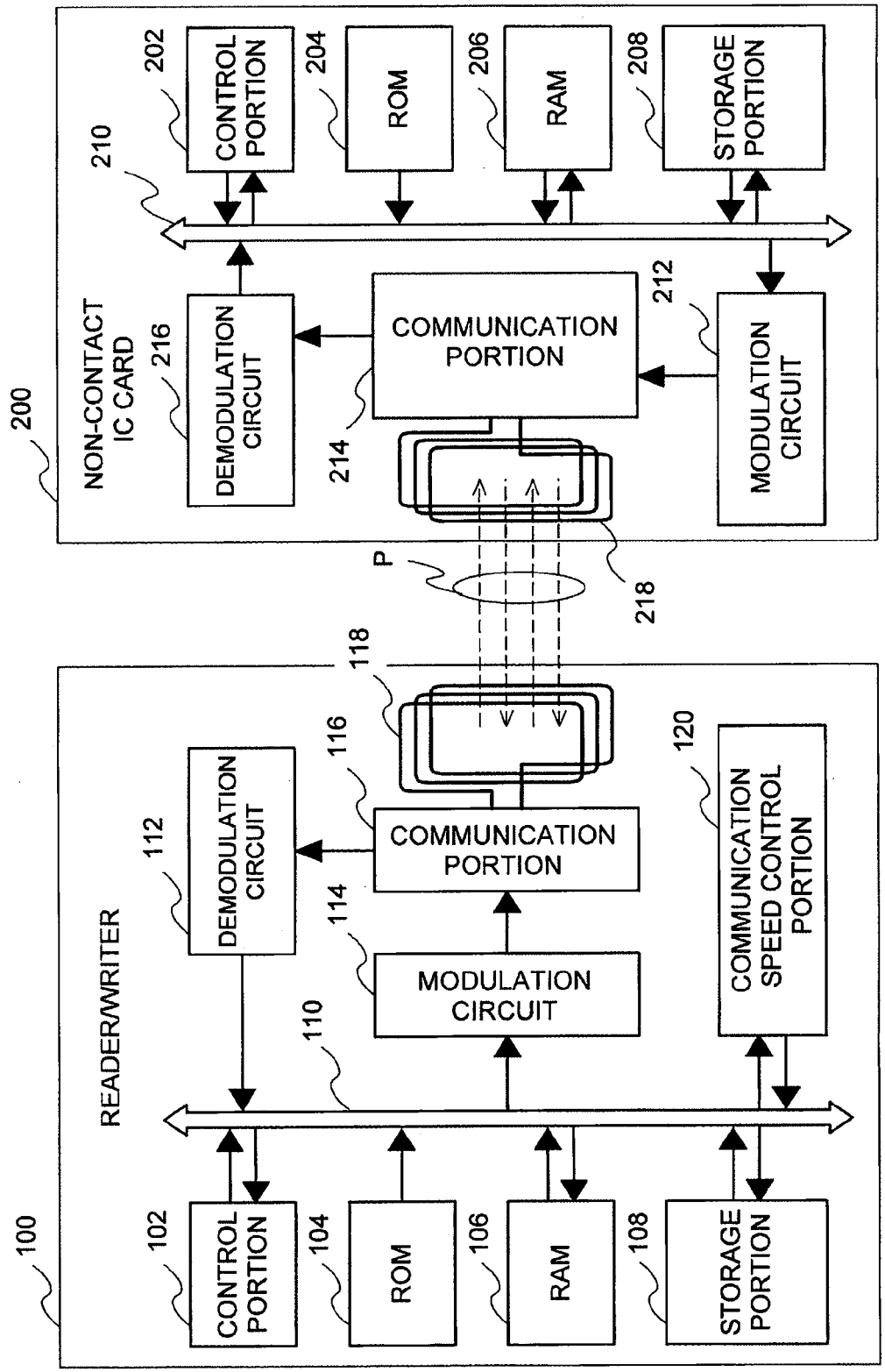
FIG. 5 is an explanatory figure that shows an example of a device configuration of a reader/writer and a non-contact IC card.

First, a configuration of a non-contact communication system according to the present embodiment will be explained with reference to FIG. 5. FIG. 5 is an explanatory figure that shows an example of the configuration of the non-contact communication system according to the present embodiment. As shown in FIG. 5, the non-contact communication system is configured from a reader/writer 100 and a non-contact IC card 200.

The reader/writer 100 is mainly configured from a control portion 102, a read only memory (ROM) 104, a random access memory (RAM) 106, a storage portion 108, a bus 110, a demodulation circuit 112, a modulation circuit 114, a communication portion 116, an antenna 118, and a communication speed control portion 120. Note that the control portion 102, the ROM 104, the RAM 106, the storage portion 108, the communication speed control portion 120, the demodulation circuit 112, and the modulation circuit 114 may be connected through the bus 110, for example. Note also that the communication portion 116 and the communication speed control portion 120 are examples of a transmission portion.

The control portion 102 is configured from a central processing unit (CPU) and the like and performs a specified process based on a program, a script, or the like that is stored in one of the ROM 104, the RAM 106, and the storage portion 108. For example, based on the program, the script, or the like, the control portion 102 may control the operation of each configuring element that configures the reader/writer 100. The control portion 102 also controls each configuring element such that information that is read from the non-contact IC card 200 is recorded in the storage portion 108 and information that is recorded in the non-contact IC card 200 is updated based on information that is read from the storage portion 108.

The control portion 102 may also create a polling command based on a program, a script, or the like that is recorded in the storage portion 108 or the like. For example, the control portion 102 may create the polling command in the first format and create the polling command in the second format. Alternatively, the control portion 102 may have a packet structure that is described later and may create the combination-format polling command that is compatible with both the first format and the second format. The control portion 102 may also acquire polling commands that are respectively compatible with each format, acquiring the polling commands from an external control device, a semiconductor chip, or the like that is connected to the reader/writer 100. Note that the storage portion 108 may be formed from one of a tamper-proof secure memory and a secure chip, for example.

The antenna 118 may be formed from a loop antenna, for example, and can transmit and receive signals using load modulation when it is magnetically coupled with an antenna 218 of the non-contact IC card 200. The communication portion 116 is a portion for transmitting and receiving modulated signals to and from the non-contact IC card 200 through the antenna 118. The communication portion 116 can transmit the polling command, for example, at specified time intervals. The demodulation circuit 112 is a portion that, based on a specified type of modulation, demodulates a packet that is received by the communication portion 116 through the antenna 118. For example, the demodulation portion 112 can demodulate a packet that has been modulated by a type of modulation such as amplitude shift keying (ASK) or the like.

The modulation circuit 114 is a portion that creates a modulated signal by performing a specified type of modulation on a transmission packet that is output by the control portion 102 or the like. The communication speed control portion 120 is a portion that varies the communication speed when an area within a single transmission packet is transmitted. For example, the communication speed control portion 120 may perform processing that modulates a specified area of a single transmission packet at a degree of modulation multiplexing that differs from that used for another area. In this case, the communication speed control portion 120 operates in coordination with one of the modulation circuit 114 and the communication portion 116 to vary the communication speed.

The non-contact IC card 200 is mainly configured from a control portion 202, a ROM 204, a RAM 206, a storage portion 208, a bus 210, a modulation circuit 212, a communication portion 214, a demodulation circuit 216, and the antenna 218. Note that the control portion 202, the ROM 204, the RAM 206, the storage portion 208, the modulation circuit 212, and the modulation circuit 216 may be connected through the bus 210, for example.

The control portion 202 is configured from a central processing unit (CPU) and the like and performs a specified process based on a program, a script, or the like that is stored in one of the ROM 204, the RAM 206, and the storage portion 208. For example, based on the program, the script, or the like, the control portion 102 may control the operation of each configuring element that configures the non-contact IC card 200. The control portion 202 also performs control such that information is recorded in the storage portion 208 in accordance with a command that is received from the reader/writer 100 and information that is read from the storage portion 208 is transmitted to the reader/writer 100.

The control portion 202 may also create a response command based on a program, a script, or the like that is recorded in the storage portion 208 or the like. For example, the control portion 202 may create the response command in the first format and create the response command in the second format. The storage portion 208 may be formed from one of a tamper-proof secure memory and a secure chip, for example.

The antenna 218 may be formed from a loop antenna, for example, and is magnetically coupled with the antenna 118 of the reader/writer 100. In that state, the antenna 218 can transmit and receive signals using load modulation. The communication portion 214 is a portion for transmitting and receiving modulated signals to and from the reader/writer 100 through the antenna 218. The demodulation circuit 216 is a portion that, based on a specified type of modulation, demodulates a packet that is received by the communication portion 214 through the antenna 218. For example, the demodulation portion 216 can demodulate a packet that has been modulated by a type of modulation such as ASK or the like. The modulation circuit 212 is a portion that creates a modulated signal by performing a specified type of modulation on a response packet that is created by the control portion 202 or the like.

The non-contact communication system for implementing the method of establishing the state of communication according to the present embodiment has been explained, as have the device configurations of the reader/writer 100 and the non-contact IC card 200 that are included in the system. The method of establishing the state of communication that is implemented by the system will be explained below.

Figure 6:
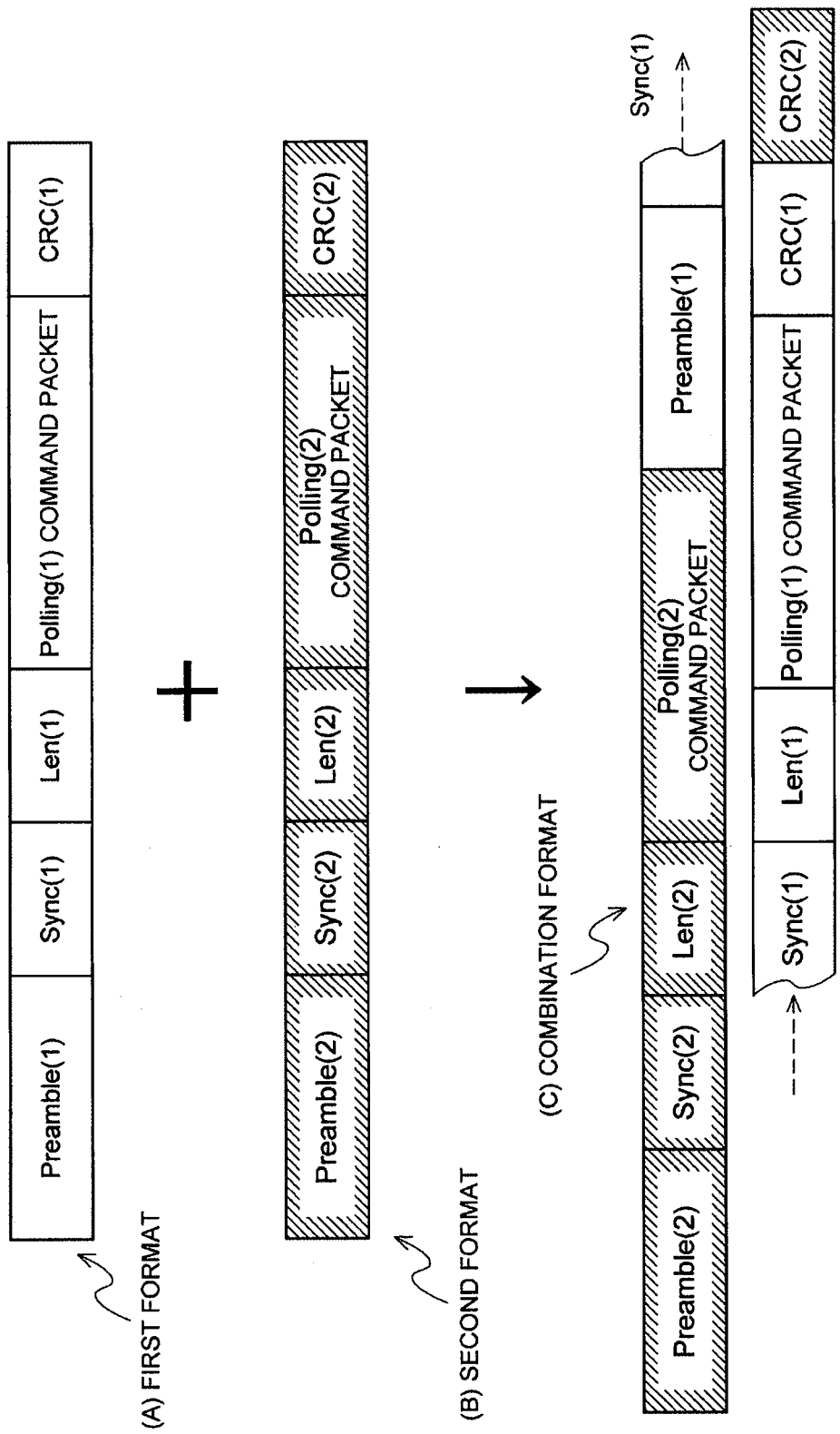
FIG. 6 is an explanatory figure that shows an example of a packet structure according to an embodiment of the present invention.

First, a packet structure of the combination-format polling command according to the present embodiment will be explained with reference to FIG. 6. FIG. 6 is an explanatory figure that shows the packet structure of the combination-format polling command according to the present embodiment.

A packet structure of the polling command in the first format is shown as (A) in FIG. 6. A packet structure of the polling command in the second format is shown as (B) in FIG. 6. The packet structure of the combination-format polling command according to the present embodiment is shown as (C) in FIG. 6.

As shown by (A), the packet for the polling command in the first format is configured from a preamble in the first format (Preamble (1)), a synchronization code in the first format (Sync (1)), a data length in the first format (Len (1)), data in the first format (Polling (1) command packet), and a cyclic redundancy code in the first format (CRC (1)).

In the same manner, the packet for the polling command in the second format, as shown by (B), is configured from a preamble in the second format (Preamble (2)), a synchronization code in the second format (Sync (2)), a data length in the second format (Len (2)), data in the second format (Polling (2) command packet), and a cyclic redundancy code in the second format (CRC (2)).

The preambles are used for synchronizing to a reference clock signal. The synchronization codes are positioned in front of the data parts and are used for detecting the beginning of the data. The data lengths are used for detecting the data end positions. The data are the polling commands themselves. The cyclic redundancy codes are used in error detection processing that detect whether the data are valid. The examples in (A) are each compatible with the first format. The examples in (B) are each compatible with the second format.

As explained previously, in a case where the polling command packet structures shown in (A) and (B) of FIG. 6 are both used, extra time is required until the state of communication is established, because the reader/writer 100 must alternately transmit the polling command in the first format and the polling command in the second format. Accordingly, the combination-format packet structure shown in (C) is used in the present embodiment.

As shown by (C) in FIG. 6, the packet of the combination-format polling command according to the present embodiment includes, in order from the beginning, the preamble, the synchronization code, the data length, and the data in the second format, followed in order by the preamble, the synchronization code, the data length, the data, and the cyclic redundancy code in the first format, with the cyclic redundancy code in the second format appended at the end. That is, the packet of the combination-format polling command is formed such that the polling command in the first format is inserted between the data part and the cyclic redundancy code of the polling command in the second format.

In other words, the packet of the combination-format polling command is formed such that the entire packet of the polling command in the first format is contained in the data part in the second format. In this case, the data length in the second format is used for finding the end position of the data in the second format. Note that the synchronization code in the first format is not included in the data part in the second format.

In a case where the combination-format polling command is received by a non-contact IC card 200 that is compatible only with the first format, for example, the non-contact IC card 200 can ignore the packet of the polling command in the second format as noise and can read only the packet of the polling command in the first format.

On the other hand, in a case where the combination-format polling command is received by a non-contact IC card 200 that is compatible with both the first format and the second format, the non-contact IC card 200 can read the packet of the polling command in the second format and can ignore the packet of the polling command in the first format. The non-contact IC card can also use the cyclic redundancy code in the second format to check the validity o the data.

Figure 7:
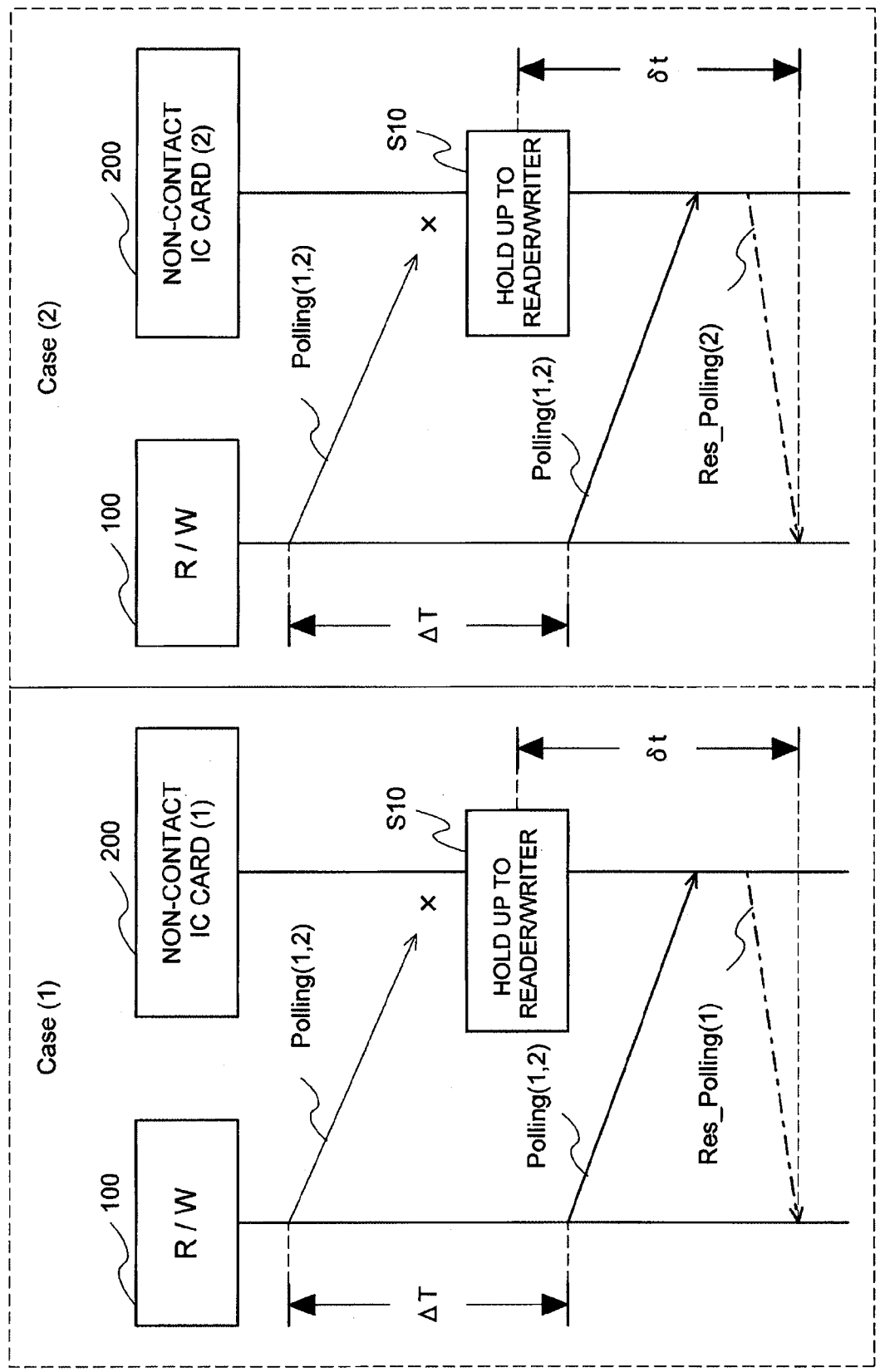
FIG. 7 is an explanatory figure that shows examples of polling command transmission timings and response timings of a combination method according to the embodiment.

The processing to establish the state of communication in cases where the combination-format polling command described above is used will be explained with reference to FIG. 7. FIG. 7 is an explanatory figure that shows flows of the processing to establish the state of communication in cases where the combination-format polling command according to the present embodiment is used. Note that FIG. 7 shows the flow of the processing to establish the state of communication in a case (Case (1)) where a non-contact IC card 200 that is compatible with only the first format is held up to the reader/writer and in a case (Case (2)) where a non-contact IC card 200 that is compatible with both formats is held up to the reader/writer.

Case (1) will be explained first. As shown in FIG. 7, the reader/writer 100 transmits the combination-format polling command (Polling 1, 2) at the specified interval of time □T. When the non-contact IC card 200 that is compatible with only the first format is held up to the reader/writer 100 (S10), the combination-format polling command is received by the non-contact IC card 200. The non-contact IC card 200 then interprets the part of the combination-format polling command packet that corresponds to the polling command in the first format and transmits a response packet in the first format (Res_Polling (1)) to the reader/writer 100.

Based on the response packet in the first format that is received from the non-contact IC card 200, the reader/writer 100 establishes the state of communication in the first format. That is, while a state exists in which a communication path with the non-contact IC card 200 has been established, the reader/writer 100 uses commands in the first format to access the non-contact IC card 200. In this case, the format (the first format) of the non-contact IC card 200 is uniquely determined by a single response, so after the non-contact IC card 200 is held up to the reader/writer 100, the time □t that is required until the state of communication is established is reliably shorter than the time □t2 that is required to establish the state of communication using the method shown in FIG. 4.

Next, Case (2) will be explained. The reader/writer 100 transmits the combination-format polling command (Polling 1, 2) at the specified interval of time □T. When the non-contact IC card 200 that is compatible with the second format is held up to the reader/writer 100 (S10), the combination-format polling command is received by the non-contact IC card 200, regardless of whether or not the non-contact IC card 200 is compatible with the first format. The non-contact IC card 200 then interprets the part of the combination-format polling command packet that corresponds to the polling command in the second format and transmits a response packet in the second format (Res_Polling (2)) to the reader/writer 100.

Based on the response packet in the second format that is received from the non-contact IC card 200, the reader/writer 100 establishes the state of communication in the second format. That is, while a state exists in which a communication path with the non-contact IC card 200 has been established, the reader/writer 100 uses commands in the second format to access the non-contact IC card 200. In this case, the format (the second format) of the non-contact IC card 200 is uniquely determined by a single response, so after the non-contact IC card 200 is held up to the reader/writer 100, the time □t that is required until the state of communication is established is reliably shorter than the time □t2 that is required to establish the state of communication using the method shown in FIG. 4.

As described above, the use of the combination-format polling command according to the present embodiment makes it possible to determine the command format with a single response, regardless of whether the non-contact IC card 200 that is held up to the reader/writer 100 is compatible with the first format or the second format. Of course, even if the non-contact IC card 200 that is compatible with the second format is also compatible with the first format, the non-contact IC card 200 reads the part of the packet that corresponds to the polling command in the second format and transmits the response command in the second format, so the command format can be determined independently of the card's compatibility with the first format. The time □t that is required until the state of communication is established can therefore be decreased, regardless of the command format of the non-contact IC card 200, thus making the overall processing faster and more efficient.

Figure 8:
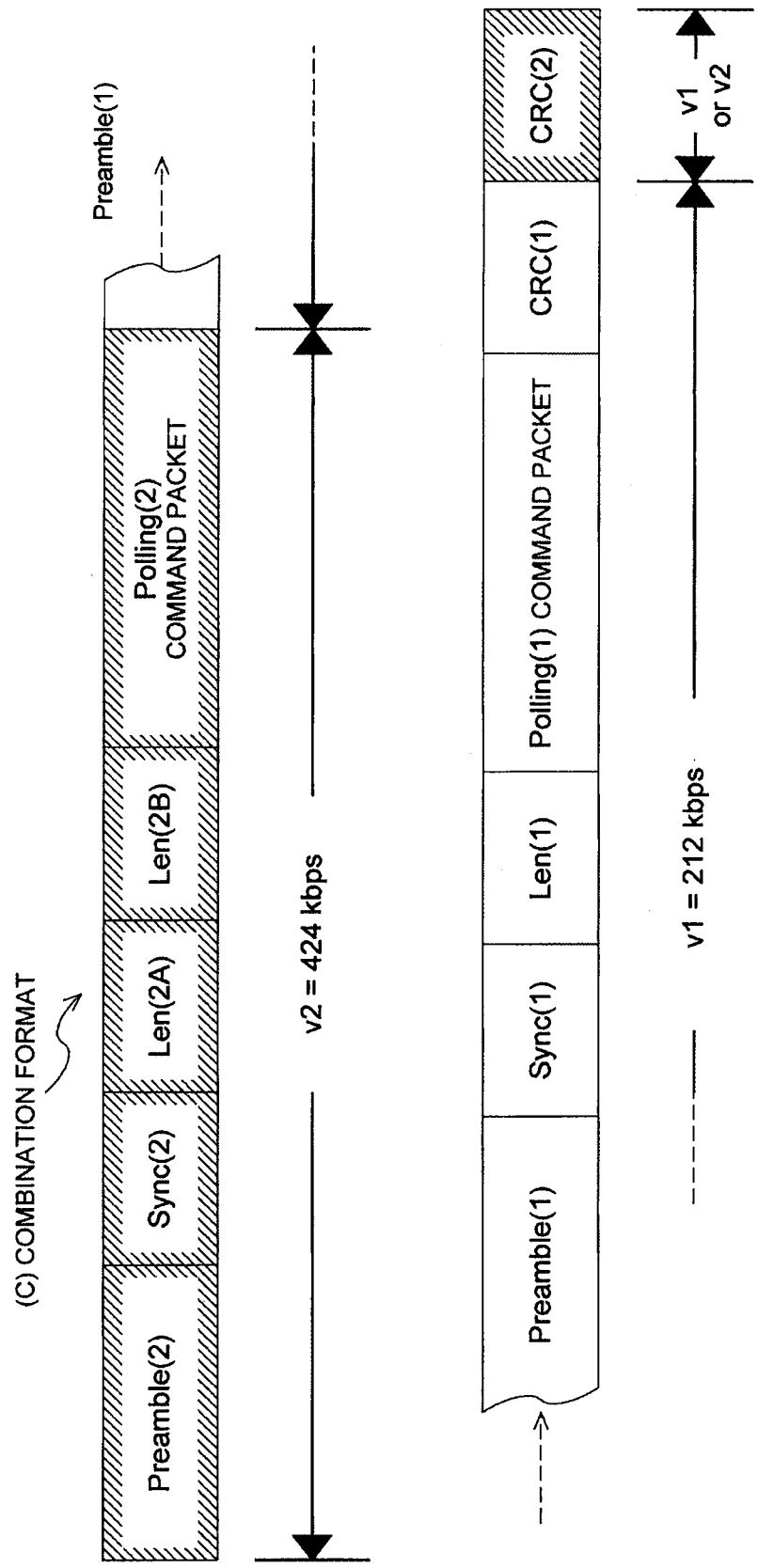
FIG. 8 is an explanatory figure that shows an example of a packet structure according to the embodiment.

Next, a modified example of the packet structure of the combination-format polling command according to the present embodiment will be explained with reference to FIG. 8. FIG. 8 is an explanatory figure that shows the packet structure of the combination-format polling command according to the modified example of the present embodiment.

A feature of the modified example is that the communication speed for the part of the combination-format polling command packet that is in the first format is different from the communication speed for the part that is in the second format. For example, in some cases, the communication speed at which a non-contact IC card 200 for the first format can transmit and receive signals is different from the communication speed at which a non-contact IC card 200 for the second format can transmit and receive signals.

If the combination-format polling command packet structure indicated by (C) in FIG. 6 is used, the reader/writer 100 transmits the entire combination-format polling command at the lower of the communication speed for the first format and the communication speed for the second format. This is done because the command format of the non-contact IC card 200 that is held up to the reader/writer 100 has not yet been determined. However, after the command format has been determined, the reader/writer 100 can transmit and receive signals at a communication speed that is appropriate for the command format. In other words, if the combination-format polling command packet structure indicated by (C) in FIG. 6 is used in a case where the communication speed differs according to the command format, then in a case where the non-contact IC card 200 that is held up to the reader/writer 100 is compatible with a high-speed format, the processing to establish the state of communication will be slightly less efficient than in a case where a format that will be described later is used.

Accordingly, in the modified example, as shown in FIG. 8, a packet structure is proposed that changes a part of the packet structure of the combination-format polling command and varies the communication speed according to the command format.

As shown in FIG. 8, the packet of the combination-format polling command according to the modified example includes, in order from the beginning, the preamble, the synchronization code, two data lengths (2A, 2B), and the data in the second format, followed in order by the preamble, the synchronization code, the data length, the data, and the cyclic redundancy code in the first format, with the cyclic redundancy code in the second format appended at the end. That is, a point that the packet of the combination-format polling command has in common with the packet structure (C) in FIG. 6 is that the packet is formed such that the polling command in the first format is inserted between the data part and the cyclic redundancy code of the polling command in the second format. However, a point of difference is that the packet is provided with the two data lengths in the second format.

The two data lengths (2A, 2B) in the second format are used for finding the end position of the data in the second format and the start position of the cyclic redundancy code in the second format. In other words, a point that the packet of the combination-format polling command has in common with the packet structure (C) in FIG. 6 is that the entire packet of the polling command in the first format is contained in the data part in the second format, but a point of difference is that the start position of the cyclic redundancy code in the second format is specified.

For example, in a case where the communication speed v1 for the first format is 212 kbps and the communication speed v2 for the second format is 424 kbps, as shown in FIG. 8, if there is no data length that indicates the start position of the cyclic redundancy code in the second format, the possibility exists that the non-contact IC card 200 that is compatible with the second format will not be able to recognize the start position of the cyclic redundancy code in the second format. In other words, if the packet part in the first format generates significant noise, such that the start position of the cyclic redundancy code in the second format becomes unclear, it will not be possible to establish the validity of the polling command in the second format, and the packet part in the second format will be discarded.

However, if both the data length that indicates the end position of the data in the second format and the data length that indicates the start position of the cyclic redundancy code in the second format are included in the packet, the non-contact IC card 200 that is compatible with the second format will be able to perform a cyclic redundancy check for the packet part in the second format. Note that the non-contact IC card 200 that is compatible with the first format cannot read the packet part in the second format, regardless of the communication speed, so it simply ignores the packet part in the second format as noise, reads only the packet part in the first format, and performs the processing accordingly.

Further, the communication speed that is used to transmit the cyclic redundancy code in the second format may be either the communication speed v1 for the first format or the communication speed v2 for the second format. Note that the communication speed may be determined according to a parameter such as an encoding method, an encoding ratio, a modulation method, a degree of modulation multiplexing, and the like. This would make it possible, in some cases, for the non-contact IC card 200 that is compatible with the second format to check the validity of a packet even if the packet does not include a data length that indicates the start position of the cyclic redundancy code in the second format. In that case, a packet structure may be used that does not include a data length that indicates the start position of the cyclic redundancy code in the second format. Even such a packet structure would fall within the technical scope of the present embodiment.

Using the modified example would make it possible to transmit the polling command more efficiently and at higher speed. Note that the application of a technology that includes a plurality of data lengths as information items would make it possible to form a combination-format polling command that would be compatible with more than two formats. Moreover, the synchronization code in the first format could be included in the data part in the second format.

The possibility of applying the technology according to the present embodiment to a plurality of communication protocols related to non-contact IC cards will be discussed. The communication protocols for non-contact IC cards include, for example, the type A and type B protocols prescribed by the international standard ISO 14443 (hereinafter called "ISO 14443-A" and "ISO 14443-B"), the standard protocols for IC cards for high-speed processing, as standardized by the Japan IC Card System Application Council (JICSAP), and the like. The technology according to the present embodiment can be applied in implementing any of these protocols in the reader/writer 100 that is compatible with a plurality of command formats and in the non-contact IC card 200.

However, the modulation methods and encoding methods are different for different protocols, so it may be necessary in some cases to apply the technology of the modified example 1 described above, for example. In the modified example, an example was given of a configuration in which the communication speed is varied according to the command format. However, this may be changed to an example in which the encoding method, the modulation method, or the like is varied. For example, the main difference between the ISO 14443-B protocol and the JICSAP protocol is in the encoding method, so the encoding method may be varied according to the communication protocol.

Figure 9:
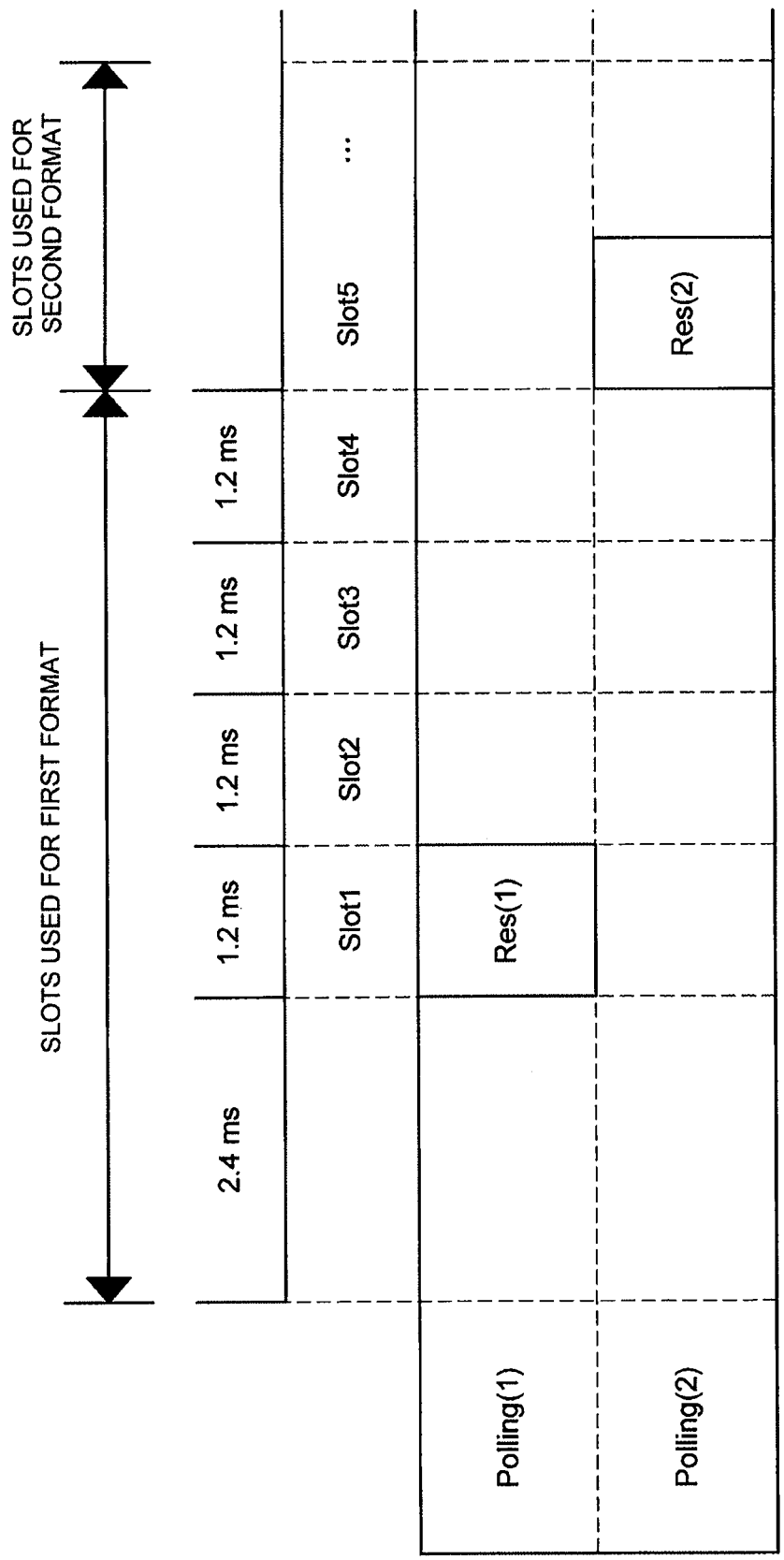
FIG. 9 is an explanatory figure that shows an example of a slot allocation for a response packet according to the embodiment.

Next, a method of allocating slots that are used for transmitting the response commands that are transmitted in response to the polling commands will be explained with reference to FIG. 9. FIG. 9 is an explanatory figure that shows the method of allocating the slots for the response commands according to the present embodiment.

As shown in FIG. 9, the responses to the polling commands are managed by using time-divided slots in such a way that the responses do not collide in a case where a plurality of the non-contact IC cards 200 are held up to the reader/writer 100. In the present embodiment, a method is proposed that manages the responses in a plurality of formats, where collisions can occur comparatively easily, by allocating the response to different slots.

For example, the reader/writer 100 transmits a polling command that designates a maximum value for a slot number that will be used for a response in the first format. The non-contact IC card 200 that is compatible with the first format selects any slot whose number is not greater than the maximum value and uses the selected slot to respond. In contrast, the non-contact IC card 200 that is compatible with the second format selects any slot whose number is greater than the maximum value designated by the polling command and uses the selected slot to respond. In the example in FIG. 9, the slot number 4 (Slot 4) is designated as the maximum value. This makes it possible to avoid collisions in the slots that are used for the responses to the polling commands.

As explained above, using the technology according to the present embodiment makes it possible to check efficiently and quickly the command format of the non-contact IC card 200 that is held up to the reader/writer 100 in communication systems with different specifications or different communication protocols, for example. Furthermore, the technology described above is effective in implementing a system environment where a plurality of formats can co-exist, and it can reduce confusion and costs that are generated during transitions from one version or one standard to another version or standard.

It should be understood by those skilled in the art that various modifications, combinations, sub-combinations and alterations may occur depending on design requirements and other factors insofar as they are within the scope of the appended claims or the equivalents thereof.

For example, in the embodiment described above, the non-contact communication system was explained as being configured from the reader/writer 100 and the non-contact IC card 200. However, instead of being implemented in the reader/writer 100, the technology of the present embodiment may be implemented in an information processing device that is provided with the functions of the reader/writer 100, such as a personal computer, a mobile telephone, a smart phone, a PDA, a communication device, a home information appliance, or the like. Further, instead of being implemented in the non-contact IC card 200, the technology may be implemented in an information processing device that is provided with the functions of the non-contact IC card 200, such as a personal computer, a mobile telephone, a smart phone, a PDA, a communication device, a home information appliance, or the like. These implementations are also obviously included within the technical scope of the present embodiment.

In addition, in the packet structure that was shown in the embodiment described above, the packet in the first format is inserted between the end position of the data in the second format and the start position of the cyclic redundancy code in the second format. However, a packet structure may be used in which the packet in the first format is appended after the packet in the second format, including the cyclic redundancy code, for example.

In the explanation of the embodiment described above, the packet structure of the combination-format polling command that is compatible with two formats was explained with reference to FIG. 6 and the like. However, the technology according to the embodiment described above can also be extended to accommodate more than two formats. An example of a packet structure for a polling command that is compatible with three formats will be explained with reference to FIG. 10.

Figure 10:
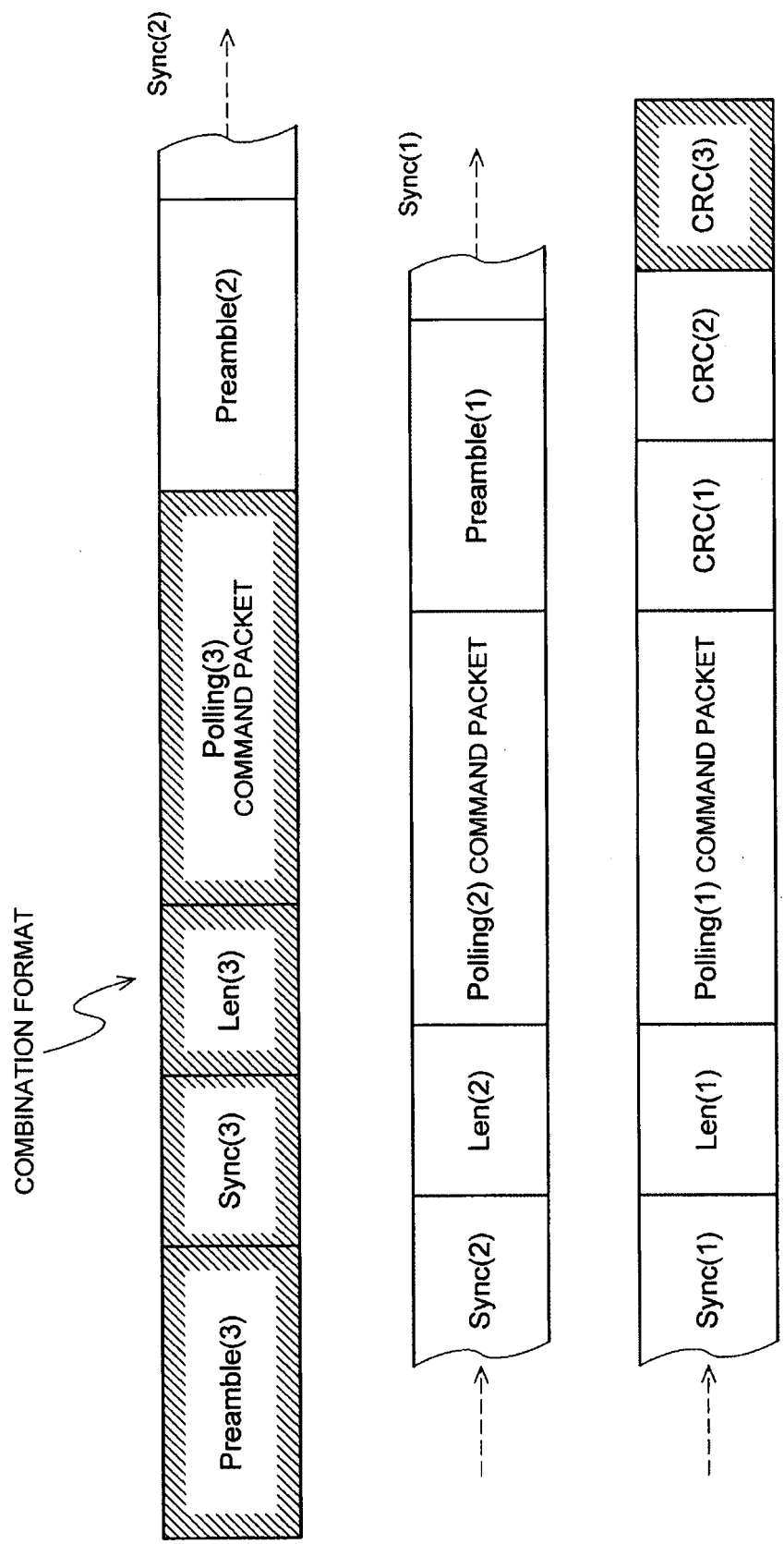
FIG. 10 is an explanatory figure that shows an example of a packet structure according to the embodiment.

As shown in FIG. 10, the packet of the polling command that is compatible with three formats has a structure that includes, in order from the beginning, the preamble, the synchronization code, the data length, and the data (Polling (3)) in the third format, the preamble, the synchronization code, the data length, and the data (Polling (2)) in the second format, and the preamble, the synchronization code, the data length, the data (Polling (1)), and the cyclic redundancy code in the first format, with the cyclic redundancy code in the second format and the cyclic redundancy code in the third format appended in order at the end.

In this case, the data length in the third format indicates the position of the cyclic redundancy code in the third format. The data length in the second format indicates the position of the cyclic redundancy code in the second format. The data length in the first format indicates the position of the cyclic redundancy code in the first format. The polling command that is compatible with three formats can be implemented using this sort of packet structure. The structure can also be extended to accommodate more than three formats. A polling command that is compatible with more than three formats may be implemented in the same manner as the example shown in FIG. 10, with the data length for each format indicating the position of the cyclic redundancy code for that format, and the data positioned after the data length.

What is claimed is:

1. An information processing device that is configured to perform non-contact communication in a plurality of format generations, comprising:
    a transmission mechanism that transmits repeatedly, at a specified time interval, one combination packet that is created such that it includes a first packet of first data that is compatible with a first format generation of the plurality of format generations, and a second packet of second data that is compatible with a second format generation of the plurality of format generations, the first format generation preceding the second format generation, the first packet in the combination packet including a first preamble and a first polling command packet, both in the first format generation, and the second packet in the combination packet including a second preamble and a second polling command packet, both in the second formation generation,
    wherein the first packet included in the combination packet indicates to a single recipient of the combination packet that the information processing device is capable of performing the non-contact communication at a first communication speed and the second packet included in the combination packet indicates to the single recipient of the combination packet that the information processing device is capable of performing the non-contact communication at a second communication speed different from the first communication speed, and
    wherein the transmission mechanism transmits repeatedly, at a specified time interval, the one combination packet that is created such that it includes the first packet that expresses a specified command in a first form, and the second packet that expresses the specified command in a second form.

2. The information processing device according to claim 1, wherein the transmission mechanism transmits an error detection code part that is contained in the first data at the same communication speed as the second data.

3. The information processing device according to claim 1, wherein the transmission mechanism transmits repeatedly, at a specified time interval, the one combination packet that is created such that it further includes a third packet that is compatible with a third one of the plurality of format generations.

4. The information processing device according to claim 1, wherein the information processing device is a mobile type of telephone device that has a calling function.

5. The information processing device according to claim 1, wherein the transmission mechanism transmits the one combination packet to a second information processing device at one of the first communication speed and the second communication speed, and transmits additional data to the second information processing device at the first communication speed when it is determined that the second information processing device is compatible with the first format generation of the plurality of format generations and transmits the additional data to the second information processing device at the second communication speed when it is determined that the second information processing device is compatible with the second format generation of the plurality of format generations.

6. The information processing device according to claim 1, wherein the one combination packet indicates the availability of performing the non-contact communication at the first communication speed and the second communication speed over a same distance.

7. The information processing device according to claim 1, wherein transmission mechanism transmits a first portion of the combination packet that includes the first packet at the first communication speed and transmits a second portion of the combination packet that includes the second packet at the second communication speed.

8. The information processing device according to claim 7, wherein the first portion includes the first preamble, a first synchronization code, a first data length, the first polling command packet, and a first cyclic redundancy code in the first format generation, and the second portion includes the second preamble, a second synchronization code, a second data length, the second polling command packet, and a second cyclic redundancy code in the second format generation.

9. A communication method for a first information processing device and a second information processing device that are configured to perform non-contact communication with one another in a plurality of format generations, comprising:
    transmitting repeatedly from the first information processing device, at a specified time interval, one combination packet that is created such that it includes a first packet of first data that is compatible with a first format generation of the plurality of format generations, and a second packet of second data that is compatible with a second format generation of the plurality of format generations, the first packet in the combination packet including a first preamble and a first polling command packet, both in the first format generation, and the second packet in the combination packet including a second preamble and a second polling command packet, both in the second formation generation,
    wherein the first packet included in the combination packet indicates to a single recipient of the combination packet that the first information processing device is capable of performing the non-contact communication at a first communication speed and the second packet included in the combination packet indicates to the single recipient of the combination packet that the first information processing device is capable of performing the non-contact communication at a second communication speed different from the first communication speed;
    receiving, by the second information processing device, the repeatedly transmitted one combination packet, after the second information processing device has entered an area where the non-contact communication is possible; and
    transmitting, by the second information processing device, a response packet to the first information processing device in response to a command that is indicated by one of the first packet and the second packet, within the received one combination packet, that is in a format that is compatible with the second information processing device,
    wherein the transmitted one combination packet contains information on a slot range within which the response packet that will be transmitted by the second information processing device configured to allocate.

10. A non-transitory computer readable storage medium having stored thereon a program having instructions that when executed by a processor, causes the processor to perform a method comprising:

setting a packet structure of a packet that will be transmitted repeatedly at a specified time interval when non-contact communication is performed in a plurality of format generations, and setting a structure of one combination packet that includes a first packet of first data that is compatible with a first format generation of the plurality of format generations, a second packet of second data that is compatible with a second format generation of the plurality of format generations, the first packet in the combination packet including a first preamble and a first polling command packet, both in the first format generation, and the second packet in the combination packet including a second preamble and a second polling command packet, both in the second formation generation, wherein the first packet included in the combination packet indicates to a single recipient of the combination packet that an information processing device is capable of performing the non-contact communication at a first communication speed and the second packet included in the combination packet indicates to the single recipient of the combination packet that the information processing device is capable of performing the non-contact communication at a second communication speed different from the first communication speed, and wherein the setting of the structure of the one combination packet includes setting the first packet to express a specified command in a first form, and the second packet to express the specified command in the second form.

* * * * *